United States Patent
Lee et al.

(10) Patent No.: US 9,520,932 B2
(45) Date of Patent: *Dec. 13, 2016

(54) METHOD AND APPARATUS FOR TRANSMITTING AND RECEIVING FEEDBACK INFORMATION FOR INTER-CELL COOPERATIVE TRANSMISSION IN WIRELESS COMMUNICATION CELLULAR SYSTEM

(71) Applicant: Samsung Electronics Co., Ltd., Suwon-si, Gyeonggi-do (KR)

(72) Inventors: In Ho Lee, Suwon-si (KR); Jin Kyu Han, Seoul (KR); Joon Young Cho, Suwon-si (KR); Cheng Shan, Suwon-si (KR); Sung Tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

This patent is subject to a terminal disclaimer.

(21) Appl. No.: 14/161,289

(22) Filed: Jan. 22, 2014

(65) Prior Publication Data

US 2014/0133343 A1 May 15, 2014

Related U.S. Application Data

(63) Continuation of application No. 13/376,253, filed as application No. PCT/KR2010/003592 on Jun. 4, 2010, now Pat. No. 8,634,841.

(30) Foreign Application Priority Data

Jun. 4, 2009 (KR) .................. 10-2009-0049557

(51) Int. Cl.
| H04B 7/06 | (2006.01) |
| H04B 7/04 | (2006.01) |
| H04L 5/00 | (2006.01) |

(52) U.S. Cl.
CPC .............. H04B 7/0639 (2013.01); H04B 7/04 (2013.01); H04B 7/0478 (2013.01);
(Continued)

(58) Field of Classification Search
None
See application file for complete search history.

(56) References Cited

U.S. PATENT DOCUMENTS

2004/0029573 A1  2/2004  Kim
2004/0179493 A1  9/2004  Khan
(Continued)

FOREIGN PATENT DOCUMENTS

CN        1531238 A     9/2004
CN      101373998 A     2/2009
(Continued)

OTHER PUBLICATIONS

Alcatel-Lucent: "Comparison of CSI Feedback Schemes", 3GPP Draft; R1-092149, 3rd Generation Partnership Project (3GPP), Mobile Competence Centre ; 650, Route Des Lucioles ; F-06921 Sophia-Antipolis Cedex ; France, no. San Francisco, USA, Apr. 28, 2009.

(Continued)

*Primary Examiner* — Jeffrey M Rutkowski
*Assistant Examiner* — Ning Li
(74) *Attorney, Agent, or Firm* — Jefferson IP Law, LLP

(57) ABSTRACT

A method for transmitting feedback information for collaborative transmission in a cellular radio communication system is provided. The method includes receiving, from the base station, collaborative cell information indicating a plurality of collaborative cells, determining at least two preferred collaborative cells among the plurality of collaborative cells, generating feedback information including cell indicators for discriminating between the at least two pre- (Continued)

ferred collaborative cells and the other cell, precoding matrix indicators for the at least two preferred collaborative cells, and channel quality indicators, and transmitting the feedback information via one of a control channel and a data channel.

20 Claims, 16 Drawing Sheets

(52) U.S. Cl.
CPC .......... *H04L 5/0073* (2013.01); *H04L 5/0091* (2013.01); *H04L 5/0057* (2013.01)

(56) References Cited

U.S. PATENT DOCUMENTS

| | | |
|---|---|---|
| 2007/0183371 A1 | 8/2007 | McCoy |
| 2008/0080637 A1* | 4/2008 | Khan .................. H04B 7/0617 375/267 |
| 2008/0095258 A1* | 4/2008 | She .................. H04L 25/03343 375/262 |
| 2008/0227404 A1* | 9/2008 | Harel .................. H04B 7/0632 455/69 |
| 2008/0232503 A1* | 9/2008 | Kim .................. H04B 7/0417 375/267 |
| 2008/0247488 A1 | 10/2008 | Li et al. |
| 2009/0047956 A1* | 2/2009 | Moe .................. H04J 11/0093 455/436 |
| 2009/0059844 A1* | 3/2009 | Ko .................. H04B 7/0413 370/328 |
| 2009/0215480 A1* | 8/2009 | Kim .................. H04B 7/024 455/501 |
| 2010/0027456 A1* | 2/2010 | Onggosanusi ......... H04B 7/024 370/312 |
| 2010/0232336 A1* | 9/2010 | Choudhury ............ H04B 7/024 370/312 |
| 2010/0281333 A1* | 11/2010 | Jongren ................ H04L 1/0026 714/752 |
| 2012/0020319 A1 | 1/2012 | Song et al. |
| 2012/0289275 A1* | 11/2012 | Li ........................ H04B 7/0626 455/513 |
| 2013/0058424 A1* | 3/2013 | Enescu ................ H04B 7/0486 375/267 |

FOREIGN PATENT DOCUMENTS

| | | |
|---|---|---|
| EP | 2023502 A1 | 2/2009 |
| KR | 10-2008-0073399 A | 11/2008 |
| KR | 10-0930524 B1 | 12/2009 |

OTHER PUBLICATIONS

CATT: "Analysis of feedback Signaling for Downlink CoMP", 3GPP Draft; R1-091986, 3rd Generation Partnership Project (3GPP), Mobile Competence Centre ; 650, Route Des Lucioles ; F-06921 Sophia-Antipolis Cedex ; France, no. San Francisco, USA, Apr. 28, 2009.
CATT: "Aspects of Joint Processing for Downlink CoMP", 3GPP Draft; R1-090942, 3rd Generation Partnership Project (3GPP), Mobile Competence Centre ; 650, Route Des Lucioles ; F-06921 Sophia-Antipolis Cedex ; France, no. Athens, Greece, Feb. 4, 2009.
ETRI: "Multi-cell PMI coordination for downlink CoMP", 3GPP Draft; R1-091976 PMI Coordinaion, 3rd Generation Partnership Project (3GPP), Mobile Competence Centre ; 650, Route Des Lucioles ; F-06921 Sopphia-Antipolis Cedex; France, no. San Francisco, USA, Apr. 28, 2009.

* cited by examiner

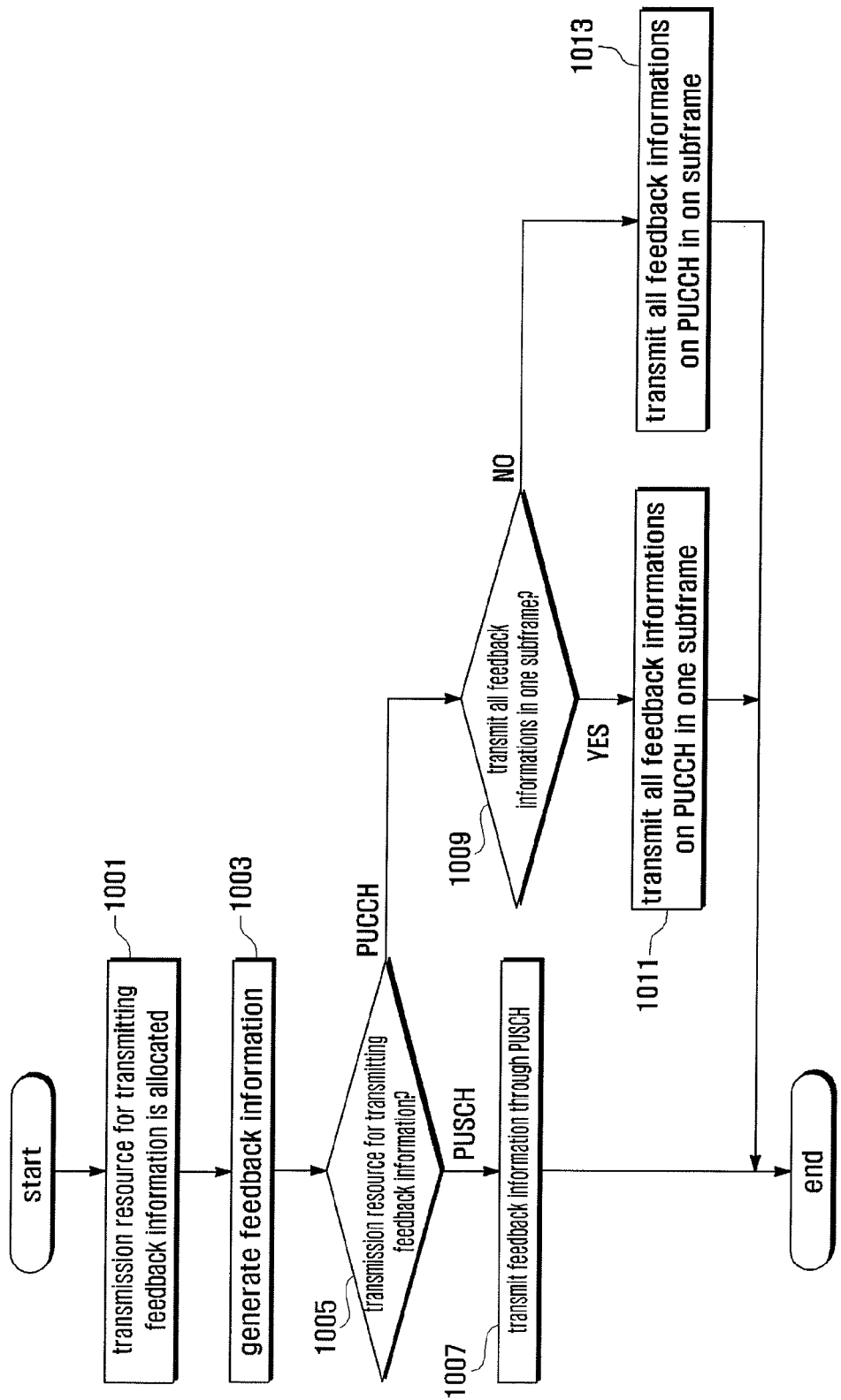

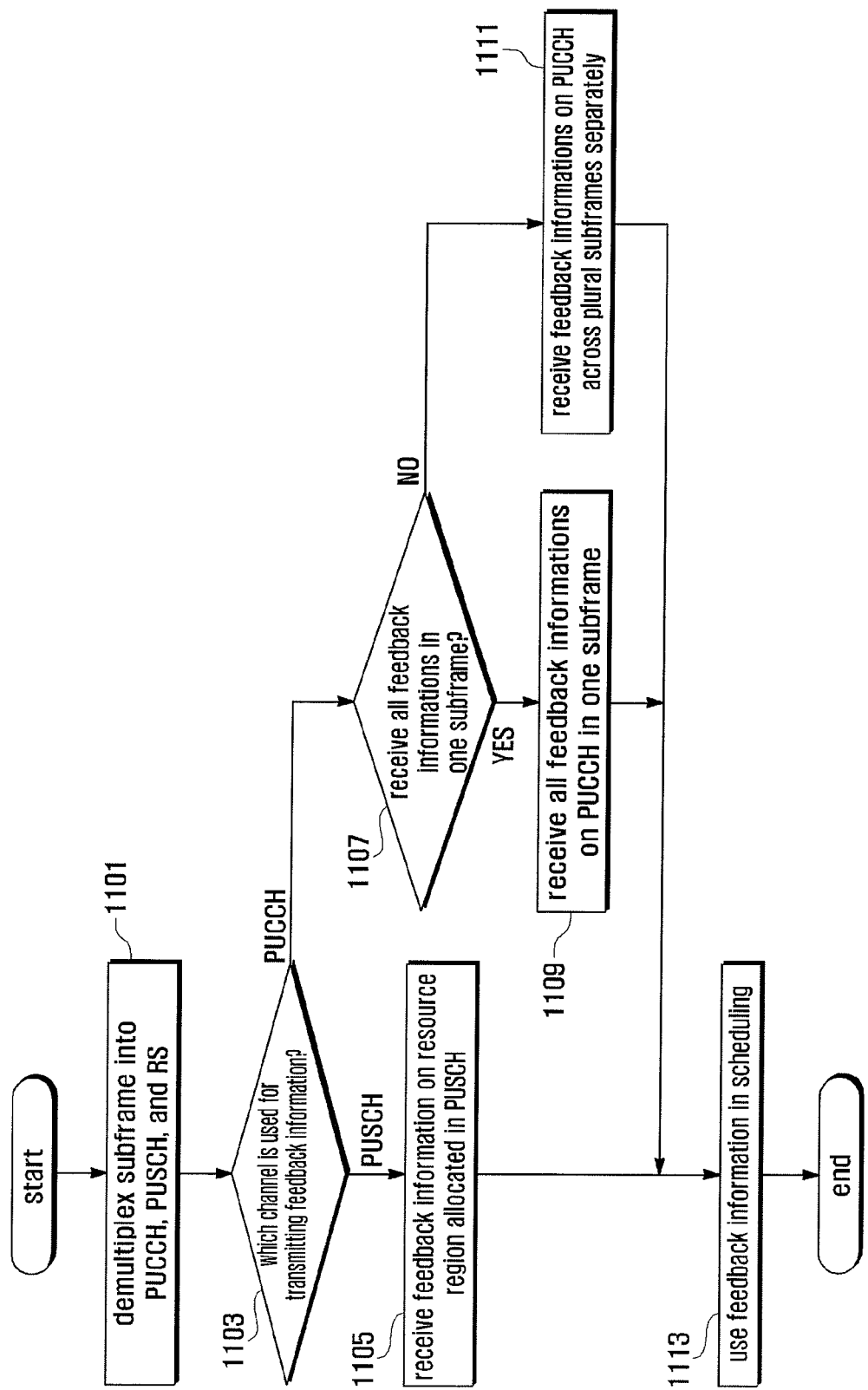

METHOD AND APPARATUS FOR TRANSMITTING AND RECEIVING FEEDBACK INFORMATION FOR INTER-CELL COOPERATIVE TRANSMISSION IN WIRELESS COMMUNICATION CELLULAR SYSTEM

This application is a continuation application of a prior application Ser. No. 13/376,253, filed on Dec. 5, 2011, which claims the benefit under 35 U.S.C. §371 of PCT/KR2010/003592, filed on Jun. 4, 2010, which claims the benefit of a Korean patent application filed on Jun. 4, 2009 in the Korean Intellectual Property Office and assigned Serial number 10-2009-0049557, the entire disclosure of each of which is hereby incorporated by reference.

BACKGROUND OF THE INVENTION

1. Field of the Invention

The present invention relates to a feedback information transmission/reception method for inter-cell cooperative transmission in a cellular radio communication system and, in particular, to a feedback information transmission/reception method and apparatus in consideration of multiple base stations involved in inter-cell cooperative transmission.

2. Description of the Related Art

The mobile communication system has evolved into a high-speed, high-quality wireless packet data communication system to provide data services and multimedia services beyond the early voice-oriented services. Recently, various mobile communication standards, such as High Speed Downlink Packet Access (HSDPA) and High Speed Uplink Packet Access (HSUPA), both defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services.

Such recent mobile communication systems adopt Adaptive Modulation and Coding (AMC) and channel sensitive techniques to improve transmission efficiency. With AMC, the transmitter can control the data amount according to channel state. That is, when the channel state is bad, the data rate is decreased to math a predetermined error rate, and when the channel state is good, the data transmission rate is increased to match another predetermined error rate. In this way, the mobile communication system can transmit large amount of information efficiently. With the channel sensitive scheduling resource management method, the transmitter can serve the user having superior channel state first selectively among multiple users and thus increase system throughput as compared to the general channel allocation and serving method. For example, the closed-loop precoding, the AMC, and channel sensitive scheduling are the techniques for using the best modulation and coding scheme at the most efficient timing based on the partial channel state information fed back by the receiver.

There has been many researches done to adopt Orthogonal Frequency Division Multiple Access (OFDMA) to next generation communication systems in place of Code Division Multiple Access (CDMA) that has been used in $2^{nd}$ and $3^{rd}$ Generation mobile communication systems. The standardization organizations such as 3GPP, 3GPP2, and IEEE are developing standards for enhanced system based on the OFDMA or modified OFDMA. It is known that OFDMA promises to increase system capacity as compared to CDMA. One of the factors affecting the increase of system capacity in an OFDMA system is the use of frequency domain scheduling. As the channel sensitive scheduling technique uses the time-varying channel for capacity gain, it is possible to increase the capacity gain with frequency-varying channel characteristic.

The closed-loop precoding, AMC, and channel-sensitive scheduling are the techniques that are capable of improving the transmission efficiency in the state where the transmitter has acquired information enough on the transmit channel. In FDD (Frequency Division Duplex) mode where the transmitter cannot estimate the state of the transmit channel based on the receive channel, it is designed for the receiver to report the information on the transmit channel to the transmitter. In the mobile communication environment, however, the channel state is time-varying such that efficiencies of the closed-loop precoding, AMC, channel sensitive scheduling techniques are degraded.

The cellular radio communication system is designed such that each base station serves the users within its coverage and hands over the control on the user getting out of the coverage to another base station. In such a cellular structure, the user located at the boundary of a cell experiences interference of the signal transmitted by other base stations such that the channel state is deteriorated. Accordingly, the user close to the base station is served at a high data rate while the user located at the cell boundary is served at a low data rage. In order to solve this problem, it is expected that the $4^{th}$ generation mobile communication system under discussion adopt the collaborative transmission technique in which multiple base stations transmit signals to the user located at the cell boundary.

Such a cell involved in the collaborative transmission is referred to as collaborative cell. The collaborative transmission can be categorized into one of a low level collaborative transmission in which the collaborative cells perform coordinated scheduling or interference avoidance beamforming to suppress the interference from neighbor cells and a high level collaborative transmission in which the collaborative cells transmit the same signals. The low level collaborative transmission technique makes the scheduling and beamforming decision collaboratively with sharing the real transmission signals. Whereas, the high level collaborative transmission technique allows the collaborative cells to share even the real transmission signals such that the channel state of the user located at the cell boundary is highly improved due to the signal reinforcement rather than interference in spite of the traffic increase in the network.

FIG. 1 is a diagram illustrating a structure of an uplink subframe based on Single-Carrier Frequency Division Multiple Access (SC-FDMA) in an LTE system.

A 10 MHz system bandwidth 103 is composed of total 50 Resource Blocks (hereinafter, referred to as RB). An RB is generated from 12 subcarriers and a basic data transmission scheduling unit. An uplink subframe 101 is composed of 14 SC-FDMA symbol durations 105. Physical Uplink Control Channel (hereinafter, referred to as PUCCH) 106 is transmitted on the RBs at both edges of the system band, and Sounding Reference Signal (hereinafter, referred to as SRS) 109 at the last SC-FDMA symbol 105 across the 10 MHz system band 103. Physical Uplink Shared Channel (hereinafter, referred to as PUSCH) 107 is transmitted in the region with the exception of the PUSCH and SRS regions of the system band, and Reference Signal (hereinafter, referred to as RS) 108 is transmitted on the SC-FDMA symbol in the middle of each slot 103. PUCCH includes Acknowledge/Negative Acknowledge (ACK/NACK) for Hybrid Automatic Repeat Request (HARQ) process, Rank Indicator (RI)

for downlink data scheduling, Precoding Matrix Indicator (PMI), and Channel Quality Indicator (CQI); and SRS is the signal for user-specific uplink channel state information acquisition and uplink transmit timing adjustment for the system bandwidth. RS is the signal carrying the channel stat information for use in PUCCH and PUSCH demodulation and decoding.

In order to maintain the single carrier characteristics in uplink transmission, PUCCH and PUSCH are not transmitted in the same subframe. The channel state information can be fed back periodically on PUCCH or non-periodically on PUSCH allocated for feedback in response to the request of the base station.

The precoding matrices defined in multi-antenna based LTE system are shown in tables 1 and 2, and the user terminal reports channel state information including the RI and PMI (codebook index or codebook indicator) corresponding to the RI to the base station through PUCCH or PUSCH.

TABLE 1

| Codebook index | Rank 1 | Rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook Index | $u_n$ | Rank 1 | Rank 2 | Rank 3 | Rank 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In table 1, $W_n^{(S)}$ is a matrix composed by taking the columns of the set $\{s\}$ from $W_n = I - 2u_n u_n^H / u_n^H u_n$. Here, I is 4×4 unitary matrix, and $u_n$ is a vector given in table 2.

In the high level collaborative transmission, the precoding to be used by the collaborative cells is not enough with the conventional codebook designed by taking notice of a single cell. That is, if the codebook designed for a single as shown in tables 1 and 2 is used, it is impossible to expect the coherent combination of the channels of the collaborative cells such that the received signal performance enhancement is limited. Meanwhile, the received signal gain may vary depending on how to use the codebook for collaborative cells. Accordingly, there has been various codebook designs and utilization methods proposed to improve the received signal gain with inter-cell cooperative transmission. Also, there is a need of the method for transmitting feedback information related to the inter-cell cooperative transmission efficiently.

SUMMARY

By taking notice of the aforementioned problems of the prior art, it is an object of the present invention to provide a codebook-based feedback information transmission/reception method and apparatus that is capable of improving the gain of the high level inter-cell cooperative transmission with a codebook designed for such purpose.

Also, it is another object of the present invention to provide a feedback information transmission/reception method and apparatus that is capable of supporting the use of a single cell-intended codebook and a multiple cell-intended codebook for the high level inter-cell cooperative transmission.

In accordance with an aspect of the present invention, a method for transmitting feedback information for collaborative transmission in a cellular radio communication system includes receiving collaborative cell information from a base station; determining preferred collaborative cells among collaborative cells indicated by the collaborative cell information; generating feedback information including preferred cell indicators for discriminating between the preferred collaborative cells and non-preferred collaborative cells, precoding matrix indicators for individual collaborative cells, phase information representing phase compensation values of the preferred collaborative cells, and channel quality indicators; and transmitting the feedback information on one of a control channel and a data channel.

Preferably, the precoding matrix indicators indicate precoding vectors corresponding to the preferred collaborative cells and non-preferred collaborative cells.

Preferably, the precoding matrix indicator indicates a precoding vector minimizing inter-cell interference in collaborative transmission and recommended to be used for the preferred collaborative cell.

Preferably, the precoding matrix indicator indicates a precoding vector minimizing inter-cell interference in collaborative transmission and recommended to be used for the non-preferred collaborative cell.

Preferably, the precoding matrix indicator indicates a precoding vector maximizing inter-cell interference in collaborative transmission and restricted to be used for the non-preferred collaborative cell.

Preferably, the feedback information has a length varying according to a number of collaborative cells or fixed regardless of the number of collaborative cells.

Preferably, the feedback informations are transmitted on the control channel in a subframe or across a plurality of subframes according to the allocated transmission resource.

In accordance with another aspect of the present invention, a method for receiving feedback information for collaborative transmission in a cellular radio communication system includes receiving feedback information including preferred cell indicators for discriminating between the preferred collaborative cells and non-preferred collaborative cells, precoding matrix indicators for individual collaborative cells, phase information representing phase compensation values of the preferred collaborative cells, and channel quality indicators, through one of a control channel and a data channel; and scheduling collaborative transmission based on the feedback information.

Preferably, the precoding matrix indicators indicate precoding vectors corresponding to the preferred collaborative cells and non-preferred collaborative cells.

Preferably, the precoding matrix indicator indicates a precoding vector minimizing inter-cell interference in collaborative transmission and recommended to be used for the preferred collaborative cell.

Preferably, the precoding matrix indicator indicates a precoding vector minimizing inter-cell interference in collaborative transmission and recommended to be used for the non-preferred collaborative cell.

Preferably, the precoding matrix indicator indicates a precoding vector maximizing inter-cell interference in collaborative transmission and restricted to be used for the non-preferred collaborative cell.

Preferably, the feedback information has a length varying according to a number of collaborative cells or fixed regardless of the number of collaborative cells.

Preferably, the feedback informations are received on the control channel in a subframe or across a plurality of subframes according to the allocated transmission resource.

In accordance with another aspect of the present invention, an apparatus for transmitting feedback information for collaborative transmission in a cellular radio communication system includes a controller which determines preferred collaborative cells among collaborative cells indicated by the collaborative cell information and generates feedback information including preferred cell indicators for discriminating between the preferred collaborative cells and non-preferred collaborative cells, precoding matrix indicators for individual collaborative cells, phase information representing phase compensation values of the preferred collaborative cells, and channel quality indicators.

Preferably, the precoding matrix indicators indicate precoding vectors corresponding to the preferred collaborative cells and non-preferred collaborative cells.

Preferably, the precoding matrix indicator indicates a precoding vector minimizing inter-cell interference in collaborative transmission and recommended to be used for the preferred collaborative cell.

Preferably, the precoding matrix indicator indicates a precoding vector minimizing inter-cell interference in collaborative transmission and recommended to be used for the non-preferred collaborative cell.

Preferably, the precoding matrix indicator indicates a precoding vector maximizing inter-cell interference in collaborative transmission and restricted to be used for the non-preferred collaborative cell.

Preferably, the feedback information has a length varying according to a number of collaborative cells or fixed regardless of the number of collaborative cells.

Preferably, the apparatus for transmitting feedback information for collaborative transmission further includes a control channel generator which generates control channel symbols with the feedback information; a data channel generator which generates data channel symbols with the feedback information; a multiplexer which maps the control and data channel symbols to respective control and data channels; and a transmission processor which transmits multiplexed control and data channels, wherein the controller includes a controller for controlling the control channel generator, data channel generator, and multiplexer to transmit the feedback information through one of the control and data channels.

Preferably, the controller controls the control channel generator, data channel generator, and multiplexer to transmit all of the feedback informations on the control channel in one subframe or across a plurality of subframes separately.

In accordance with still another aspect of the present invention, an apparatus for receiving feedback information for collaborative transmission in a cellular radio communication system includes a control channel decoder which decodes a received control channel; a data channel decoder which decodes a received data channel; and a controller which controls the control channel decoder and the data channel decoder to receive feedback information including preferred cell indicators for discriminating between the preferred collaborative cells and non-preferred collaborative cells, precoding matrix indicators for individual collaborative cells, phase information representing phase compensation values of the preferred collaborative cells, and channel quality indicators, through one of a control channel and a data channel.

Preferably, the precoding matrix indicators indicate precoding vectors corresponding to the preferred collaborative cells and non-preferred collaborative cells.

Preferably, the precoding matrix indicator indicates a precoding vector minimizing inter-cell interference in collaborative transmission and recommended to be used for the preferred collaborative cell.

Preferably, the precoding matrix indicator indicates a precoding vector minimizing inter-cell interference in collaborative transmission and recommended to be used for the non-preferred collaborative cell.

Preferably, the precoding matrix indicator indicates a precoding vector maximizing inter-cell interference in collaborative transmission and restricted to be used for the non-preferred collaborative cell.

Preferably, the feedback information has a length varying according to a number of collaborative cells or fixed regardless of the number of collaborative cells.

Preferably, the controller controls the control channel decoder to receive all of the feedback informations on the control channel in one subframe or across a plurality of subframes.

The present invention provides a codebook-based compressed feedback information report method and apparatus improving the gain of the high level inter-cell cooperative transmission with a codebook designed for such purpose.

Particularly, the present invention proposes compressed feedback formats available for use with a single cell-intended codebook and a multiple cell-intended codebook and method and apparatus for transmitting/receiving the compressed feedback formats so as to manage the high level inter-cell cooperative transmission system efficiently.

BRIEF DESCRIPTION OF THE DRAWINGS

FIG. 15 is a flowchart illustrating the feedback information transmission method according to an embodiment of the present invention.

FIG. 16 is a flowchart illustrating the feedback information reception method according to an embodiment of the present invention.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. Further, the terms used herein are defined in consideration of the functions in the present invention, and can be changed depending on the intentions of users, or precedents. Therefore, the definition of the following terms must be understood based on the entire content of the specification of the present invention.

Although the description is directed to an OFDM-based radio communication system, especially 3GPP EUTRA standard, in the following embodiments of the present invention, the subject matter of the present invention can be applied to other types of communication systems having the similar technical background and channel format with minor modification without departing from the scope of the present invention, and this is obvious to those skilled in the art of the present invention.

A description is made of the codebook-based feedback information report transmission/reception method and apparatus for high level inter-cell cooperative transmission in a cellular radio communication system according to an embodiment of the present invention.

In all of the embodiments, the collaborative cells can be determined in view of the network or the terminal. In case that the collaborative cells are determined in view of the network, the inter-cell cooperation is limited due to the restriction of the physical backhaul between base stations such that all of the terminals located in a certain cell have the same collaborative cells, while the collaborative cells determination in view of the terminal enables the base station to determine the collaborative cells per terminal on the basis of the received signal powers and Signal to Interference plus Noise Ratios of the neighbor cells that are measured and reported by the terminal.

According to an embodiment of the present invention, the terminal transmits the information necessary for the high level inter-cell cooperative transmission to the base station. The information necessary for the inter-cell cooperative transmission is referred to as "feedback information" of which format can be changed according to the codebook proposed in the present invention. Descriptions are made of the embodiments of the present invention.

First Embodiment

Figure 1:
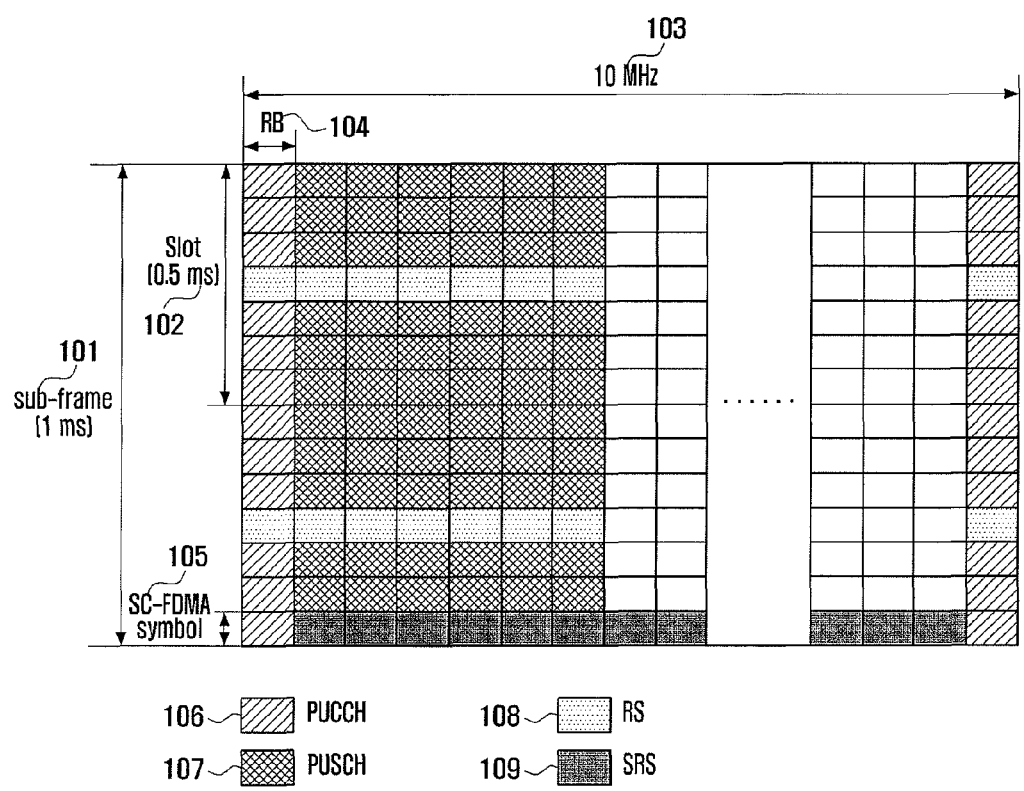
FIG. 1 is a diagram illustrating a structure of an uplink subframe based on Single-Carrier Frequency Division Multiple Access in an LTE system.
Figure 2:
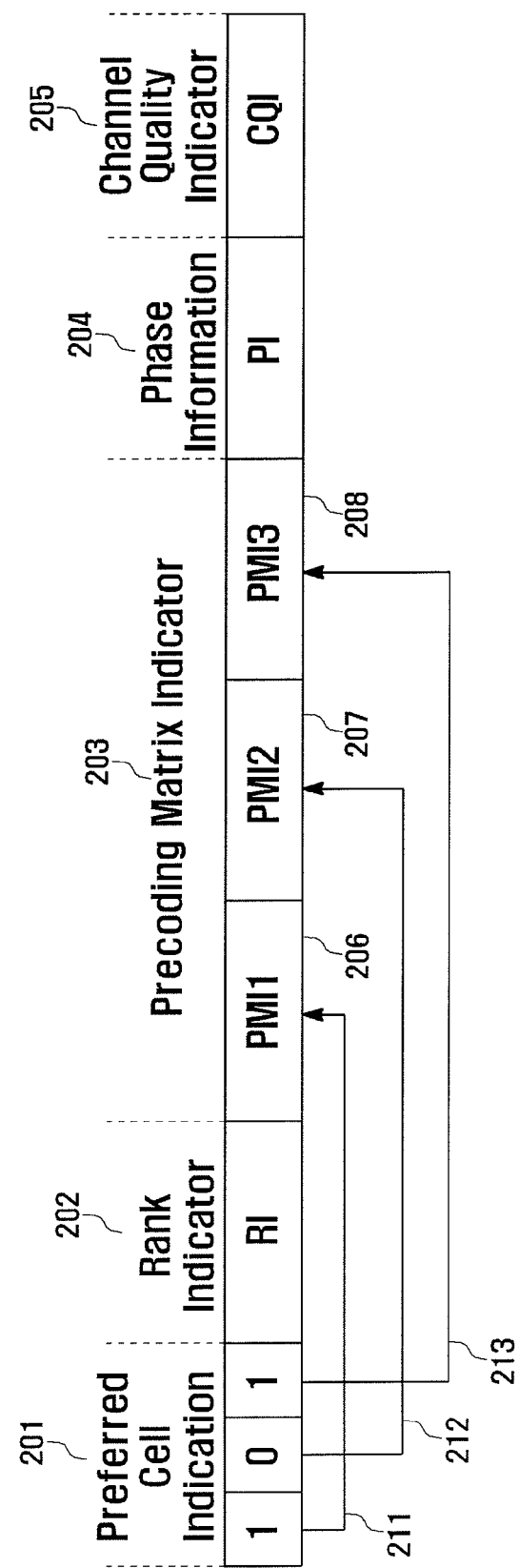
FIGS. 2 and 3 are diagrams illustrating feedback information according to the first embodiment of the present invention.
Figure 3:
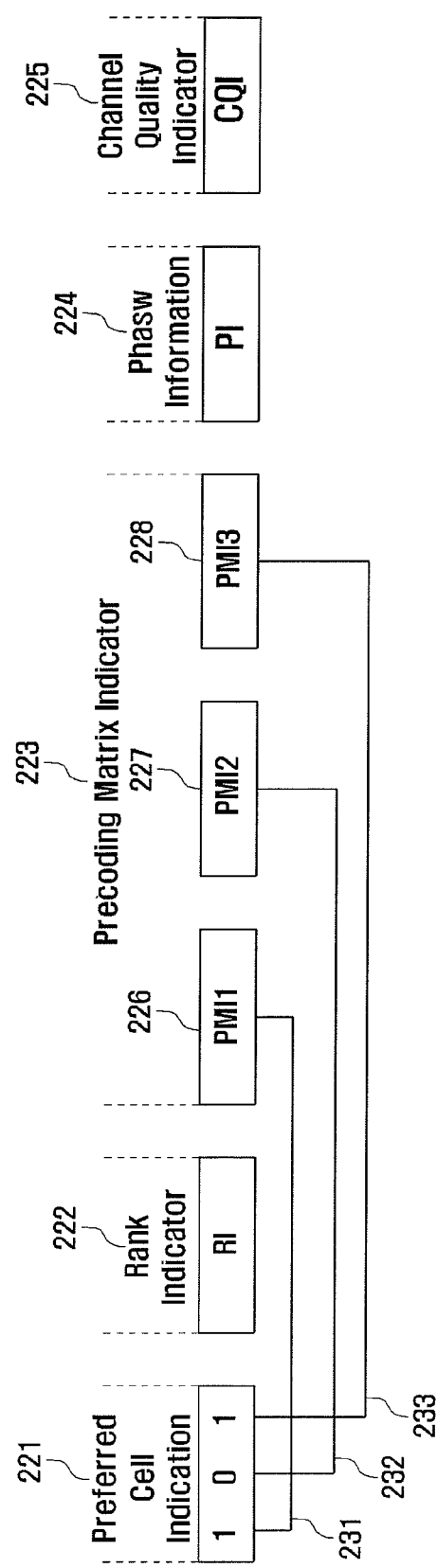

FIGS. 2 and 3 are diagrams illustrating feedback information according to the first embodiment of the present invention.

The feedback information depicted in FIGS. 2 and 3 are defined for use of the codebook designed for a single cell. The codebook designed for single cell has been described with reference to tables 1 and 2.

It is assumed that a collaborative cell configuration method in which multiple cells (base stations) involve the transmission is used and the base station determines the collaborative cells for the terminal and notifies the terminal of the determination result such that the terminal knows the number of collaborative cells and identifies the cells. According to the first embodiment of the present invention, it is assumed that the number of collaborative cells is 3.

Referring to FIGS. 2 and 3, the feedback information according to the first embodiment includes a Preferred Cell Indicator 201 and 221, a Rank Indicator (RI) 202 and 222, a Precoding Matrix Indicator (PMI) 203 and 223, a Phase Information 204 and 224, and a Channel Quality Indicator (CQI) 205 and 225.

The Preferred Cell Indicator 201 and 221 indicates the preferred cell and the non-preferred cell using a bitmap among the collaborative cells. Assuming three collaborative cells, if indicator bit is set to 1 for the preferred cell and 0 for the non-preferred cell.

RI 202 and 222 indicates a number of Ranks to be used by the collaborative base stations which is determined depending on the channel state.

PMI 203 and 223 includes the codebook index information indicating a precoding vector required or restricted in use for the individual collaborative cells. PMI 203 and 223 includes PMIs 206, 207, 208, 226, 227, and 228 mapped to the respective collaborative cells. the precoding vectors denoted by reference numbers 211, 213, 231, and 233 indicates PMI (PMI1, PMI3) mapped to the preferred cells, and reference number 212 and 232 denotes PMI (PMI2) mapped to non-preferred cells.

Here, the PMIs 206, 208, 226, and 226 mapped to the preferred collaborative cells 211, 213, 231, and 233 include values requesting the preferred collaborative cells 211, 213, 231, and 233 for use of precoding vectors mapped to the PMI. Meanwhile, the PMIs 203 and 227 mapped to the non-preferred cells include the precoding vector values that are recommended to be used by the non-preferred collaborative cells due to the low interference probability. Also, the PMIs 203 and 227 mapped to the non-preferred collaborative cells can include the precoding vectors that are recommended to be not used by the non-preferred collaborative cells due to the high interference probability.

Referring to FIGS. 2 and 3, the terminal indicates the preferred collaborative cells in the form of bitmap as denoted by reference number 201 and 221 and selects the RI 202 and 222 and PMI 206, 208, 226, and 228 preferred for the indicated cells. Here, it is assumed that the preferred cell indicator is set to 1 while the non-preferred cell indicator is set to 0. Also, it is assumed that the same RI 202 and 222 is used for the preferred collaborative cells. PMI 206, 207, 208, 226, and 228 means the index in the codebook designed for single cell.

PI 204 and 224 is the information on the compensation value for compensating channel phase between the preferred cells for collaborative transmission when using the codebook designed for signal cell. In case of using the codebook designed for single cell, phase difference occurs between the cells such that the phase of the precoding matrix is shifted according to the phase difference of a cell with the reference cell (e.g. serving cell). PI 204 and 224 means the phase compensation value of such collaborative cells.

CQI 205 and 225 is the value calculated in consideration of the channel states of the collaborative cells in collaborative transmission and can be obtained based on the aforementioned information including RI, PMI1, PMI2, PMI3, and PI.

According to an embodiment of the present invention, the above-described feedback informations can be transmitted simultaneously or separately.

In case of FIG. 2, all of the feedback informations are defined in one feedback format and mapped to the control channel (e.g. PUCCH) of a subframe so as to be transmitted to the base station at a predetermined interval or mapped to the allocated data channel (e.g. PUSCH) so as to be transmitted to the base station in response to the feedback request of the base station.

If no feedback format for carrying all of the feedback informations is defined and thus it is impossible to transmit the feedback information on PUCCH of one subframe, the feedback informations can be transmitted separately in consideration of the properties of individual feedback informations as shown in FIG. 3. That is, the preferred collaborative cell indicator 221, RI 222, PMI1 226, PMI2 227, PMI3 228, PI 224, and CQI 225 can be mapped in PUCCH at the PUCCH transmission interval of the terminal so as to be transmitted separately. In case that the feedback informations are transmitted at a subframe interval T on PUCCH as shown in FIG. 3, it takes a time duration of 7×T until receiving all of the feedback information.

According to the above-described first embodiment of the present invention, the terminal transmits the PMIs of the non-preferred collaborative cells as well the preferred collaborative cells to the base station so as to improve the received signal gain significantly in the collaborative transmission. According to the first embodiment of the present invention, the feedback information is transmitted in the transmission format having a fixed size regardless of the number of collaborative cells such that it is possible to reduce the processing complexity of the receiver. In the first embodiment, PI 204 and 224 as the channel phase information between cells is requested for all of the collaborative cells with the exception of the serving cell. Accordingly, as the number of the collaborative cells having the real transmission increases, the PI information amount increases. Thus, it is preferred to determine the fixed size of the feedback format in consideration of the maximum PI information amount for all of the collaborative cells. If the number of the preferred collaborative cells is less than maximum number of the collaborative cells, the empty space of the PI information is zero-padded to match the fixed format size. Another method for fixing the feedback information size is to define the format for carrying the PI information of one cell under the assumption that all of the preferred collaborative cells using the same PI.

A description is made of the method for transmitting/receiving feedback information according to an embodiment of the present invention hereinafter.

Figure 4:
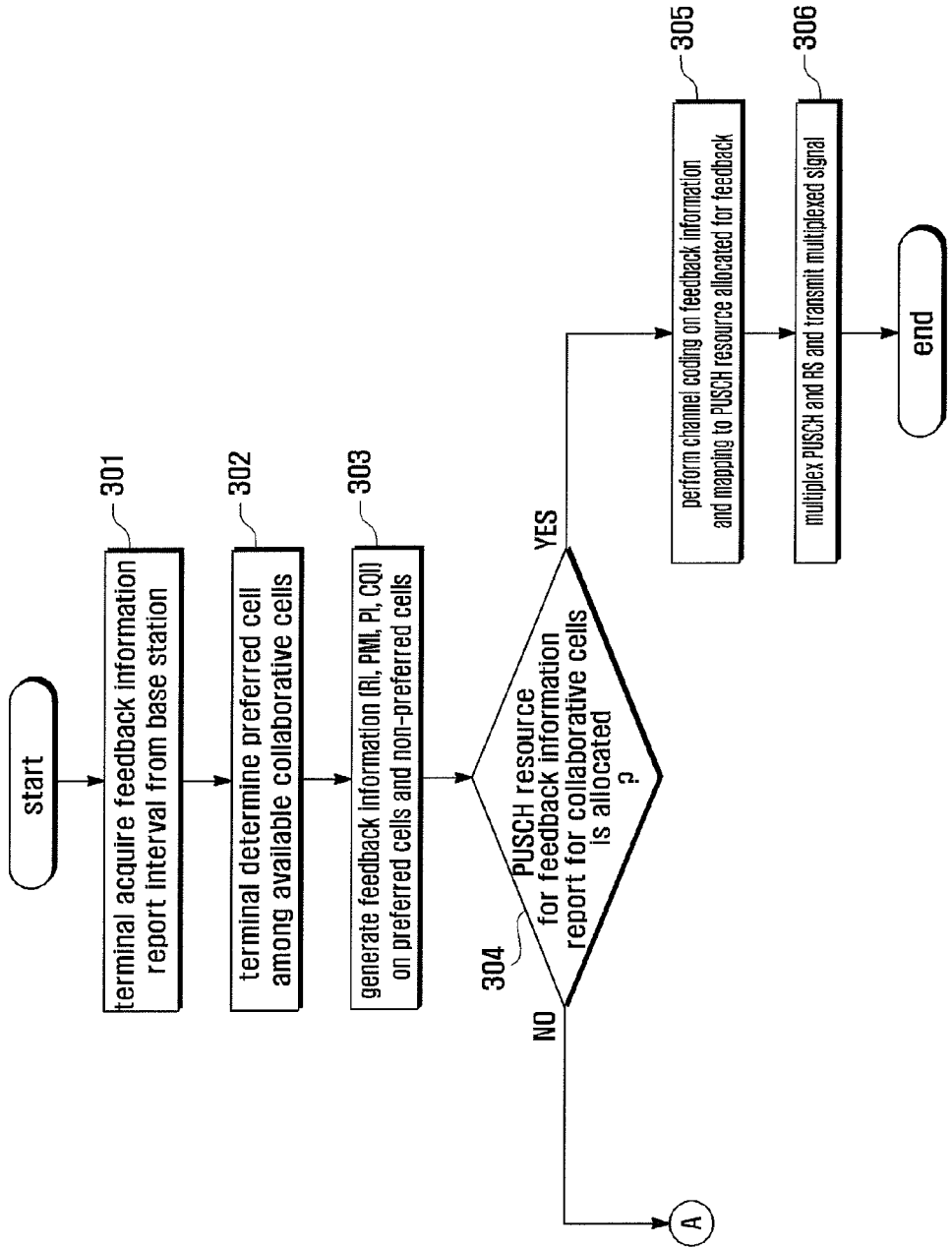
FIGS. 4 and 5 are a flowchart illustrating the feedback information transmission method according to the first embodiment of the present invention.
Figure 5:
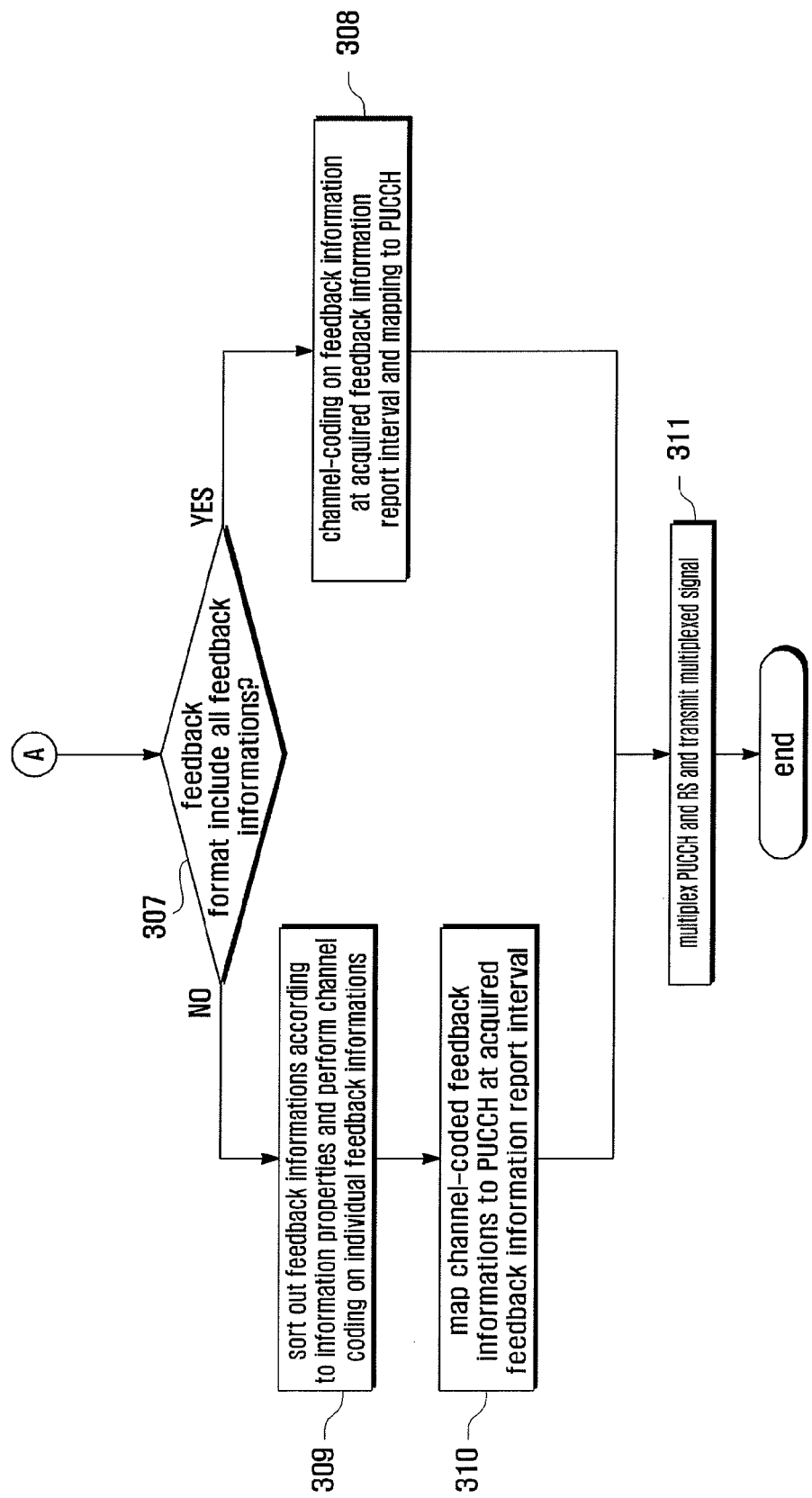

The feedback information transmission method according to the first embodiment of the present invention is described first hereinafter. FIGS. 4 and 5 are a flowchart illustrating the feedback information transmission method according to the first embodiment of the present invention.

Although not depicted in FIGS. 4 and 5, the terminal receives the informations on the collaborative cells such as cell identifiers (IDs) from the base station, and it is assumed that both the base station and terminal know the collaborative cells and a number of the collaborative cells.

Referring to FIGS. 4 and 5, the terminal acquires PUCCH transmission interval for reporting feedback information (301).

The terminal determines preferred collaborative cells for which feedback informations are generated (302). That is, the terminal generates preferred cell indicators 201 and 221 indicating the preferred collaborative cells and the non-preferred collaborative cells in the form of a bitmap. As aforementioned, the indicator is set to 1 for the preferred collaborative cell and 0 for the non-preferred collaborative cell.

After determining the preferred collaborative cells and the non-preferred collaborative cells, the terminal generates the feedback informations (RI, PMI, PI, and CQI) on the preferred and non-preferred collaborative cells (303). That is, the terminal selects PMI for each preferred collaborative cell and PMI for each non-preferred collaborative cell. Here, the terminal can select PMI recommended to be used for the preferred collaborative cells and PMI recommended to be not used for the non-preferred collaborative cells. The terminal also select RI to be used in common for the cell and PI of the neighbor cells around the serving cell. The terminal generates CQI in consideration of all of PMI, RI, and PI of the cells involved in the collaborative transmission.

In this way, the terminal generates the feedback informations through steps 301 and 303.

Once the feedback information are generated, the terminal determines whether to transmit the feedback information on PUSCH or PUCCH (304). The determination is made depending on the resource allocation state.

If the base station has allocated PUSCH for feedback information report for the collaborative transmission, the terminal performs channel coding and mapping on the generated feedback informations on the PUSCH resource allocated for the feedback information report and (305). Next, the terminal multiplexes PUSCH and RS and transmits output signal (305).

Otherwise if the base station has not allocated PUSCH for feedback information report, the terminal determines whether the generated feedback informations can be transmitted on PUSCH in one subframe (307).

If there is a feedback format for PUCCH that can carry all of the feedback informations, the terminal performs channel coding on the feedback informations at feedback information report interval informed by the base station, maps the coded information to PUCCH, multiplexes PUSCH and RS, and transmits the multiplexed signal.

If it is impossible to transmit all of the feedback informations on PUSCH in one subframe, the terminal performs channel coding on the respective informations 221, 222, 226, 227, 228, 224, and 225 separately in consideration of their properties as shown in FIG. 3 (309). Next, the terminal maps the channel-coded feedback informations to PUCCH at the feedback information report interval informed by the base station to transmit in sequence.

As described above, according to an embodiment of the present invention, it is possible to transmit the feedback information on one of PUCCH and PUSCH, and in case of using PUCCH, the feedback information can be transmitted in one subframe or multiple subframes separately.

Figure 6:
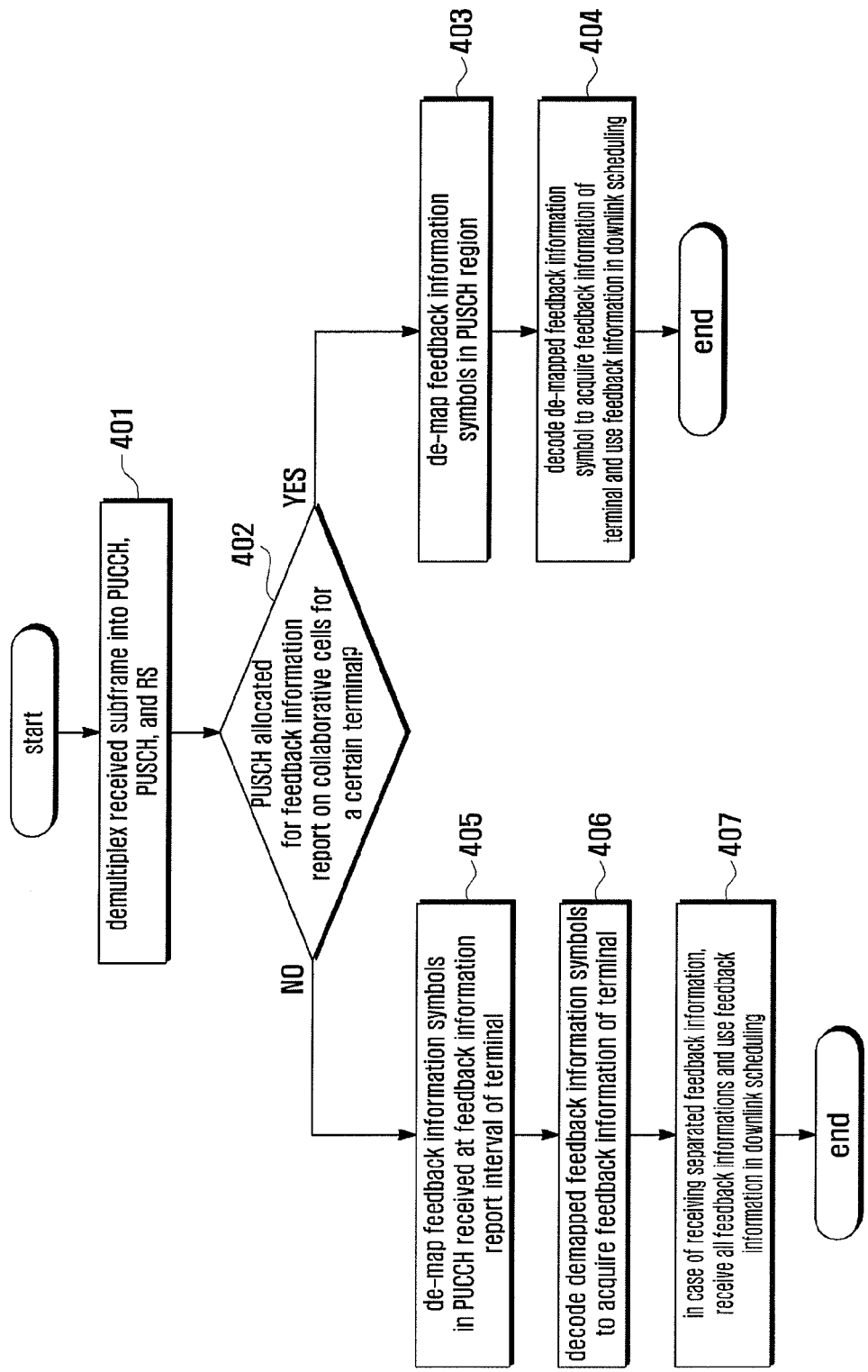
FIG. 6 is a flowchart illustrating the feedback information reception method according to the first embodiment of the present invention.

The feedback information reception method according to the first embodiment of the present invention is described hereinafter. FIG. 6 is a flowchart illustrating the feedback information reception method according to the first embodiment of the present invention.

Referring to FIG. 6, the base station demultiplexes the received subframe into PUCCH, PUSCH, and RS (401).

The base station determines whether the subframe includes PUSCH allocated for feedback information report on the collaborative cells for a certain terminal (402). As aforementioned, the terminal transmits the feedback information on one of PUSCH and PUCCH, such that the base station determines whether the feedback information is received on which of PUSCH and PUCCH.

If there is PUSCH allocated for the feedback information at step 402, the base station de-maps the symbol carrying the feedback information from PUSCH region (403). Next, the base station performs decoding the symbol of the de-mapped feedback information to acquire the feedback information transmitted by the terminal and then uses the downlink scheduling information (404).

Otherwise if there is no PUSCH allocated for the feedback information at step 402, the base station de-maps the feedback information symbol from the PUSCH region at the feedback information report interval of the corresponding terminal (405).

Next, the base station performs decoding on the demapped feedback information symbol to acquire the feedback information on the corresponding terminal (406).

If the feedback informations are received separately, the base station receives all of the feedback information and then uses the feedback information for downlink scheduling (407).

Second Embodiment

A description is made of the feedback information according to the second embodiment of the present invention.

Figure 7:
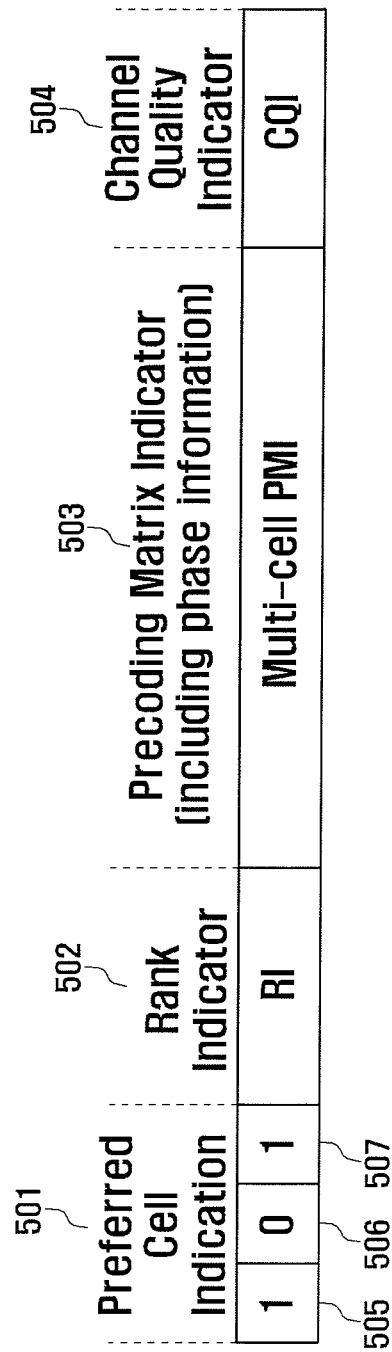
FIGS. 7 and 8 are diagrams illustrating feedback informations according to the second embodiment of the present invention.
Figure 8:
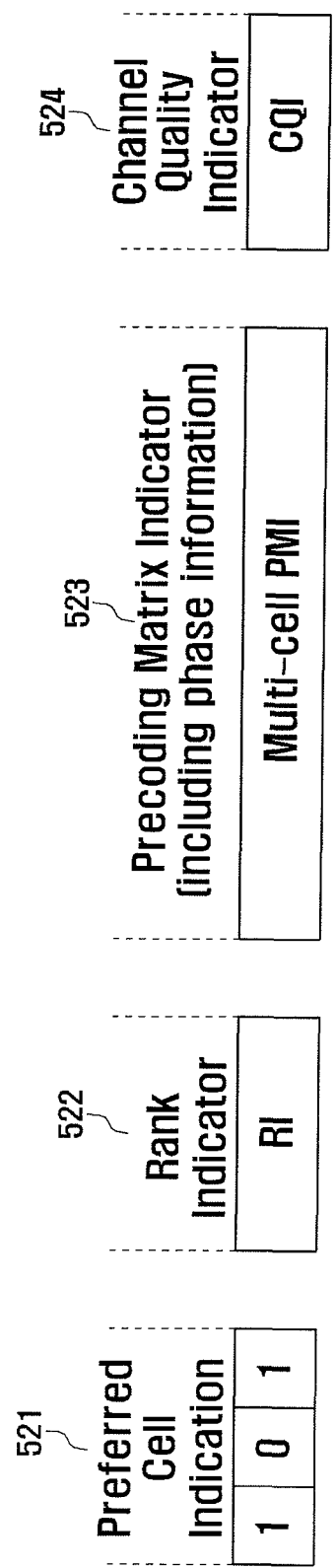

FIGS. 7 and 8 are diagrams illustrating feedback informations according to the second embodiment of the present invention.

The feedback information formats shown in FIGS. 7 and 8 are defined for the case where the codebook designed for multiple cells (hereinafter, referred to as multi-cell codebook).

The multi-cell codebook is a codebook generated for multiple cells and can be designed in such a manner of combining the single cell codebooks shown in tables 1 and 2 and the quantized PI. Such a multi-cell codebook includes only the precoding vector for the preferred collaborative cells such that its size can change according to the number of the preferred collaborative cells. This means that the sizes of the feedback information formats proposed in FIGS. 7 and 8 vary according to the number of the preferred collaborative cells. As aforementioned in the first embodiment, it is assumed that the base station and terminal know the collaborative cells and the number of collaborative cells. Although the description is directed to the case where the number of collaborative cells is 3, the present invention is not limited thereto.

Referring to FIGS. 7 and 8, the feedback information according to the second embodiment of the present invention includes Preferred Cell Indicator 501 and 521, Rank Indicator (RI) 502, Multi-cell Precoding Matrix Indicator (Multi-cell PMI) 503 and 523, and Channel Quality Indicator (CQI) 504 and 524.

The Preferred Cell Indicator 501 and 521 indicates the preferred cell or non-preferred cell of the terminal among the collaborative cells in the form of a bitmap.

RI 502 and 522 indicates a number of Ranks to be used commonly by the collaborative cells and determined according to the channel state.

Multi-cell PMI 503 and 523 is basically to recommend the precoding vectors for the preferred cells indicated by the preferred cell indicator 501 and 521, and includes only the precoding vectors for the preferred cells unlike the first embodiments. The multi-cell codebook further includes the compensation values determined in consideration of the phases of the collaborative cells in the multi-cell environment. Accordingly, the multi-cell PMI 503 and 523 denotes the precoding vector values mapped to the collaborative cells preferred by the serving cell in the multi-cell codebook determined in consideration of the phase compensation values.

The terminal indicates the preferred cells among the collaborative cells in the form of a bitmap. The terminal also selects the RI 502 and 522 and multi-cell PMI 503 and 523 for the each indicated cell. Here, it is assumed that the preferred collaborative cell is indicated by 1, and the non-preferred collaborative cell is indicated by 0. Also, it is assumed that the same RI is used for all of the collaborative cells. The multi-cell PMI denotes the index in the multi-cell codebook designed for multiple cells, and the multi-cell codebook is designed to include the inter-cell phase information.

CQI 504 and 524 is the value determined in consideration of channel states of the collaborative cells in collaborative transmission, and the terminal determines CQI 504 and 524 that can be acquired based on the selected information (RI and multi-cell PMI).

According to an embodiment of the present invention, the above-described feedback informations can be transmitted at a time or separately.

That is, the feedback informations can be defined into a feedback format to be mapped to PUCCH in a subframe and transmitted to the base station at a certain interval or the resource allocated in PUSCH in response to the feedback information request from the base station.

If there is no feedback format defined for carrying all of the feedback informations and thus if it is impossible to map the feedback informations to PUCCH of one subframe, the feedback informations can be transmitted separately in consideration of their properties as shown in FIG. 8. That is, the Preferred Cell Indicator 521, RI 522, PMI 523, and CQI 524 can be transmitted separately as mapped to PUCCH at PUCCH transmission interval of the terminal. In case that the feedback informations are transmitted separately on PUCCH at an interval of T subframes as shown in FIG. 8, the base station has to receive 4×T subframes to acquire all of the feedback informations. In case that the feedback informations are transmitted separately as shown in FIG. 8, the base station decodes the preferred cell indicator received first to acquire the information on the number of the preferred collaborative cells and estimate the size of the PMI information 523 for the multiple cells that is to be received afterward. Here, it is assumed that the size of the multi-cell codebook is variable depending on the number of the preferred collaborative cells.

According to the second embodiment of the present invention, the feedback information can be fixed in size. In order to use a fixed feedback format, it is preferred to determine the size of the feedback format in consideration of the maximum codebook length for transmitting the feedback informations on all of the collaborative cells and fill the empty space for PMIs with zero bits.

Third Embodiment

Figure 9:
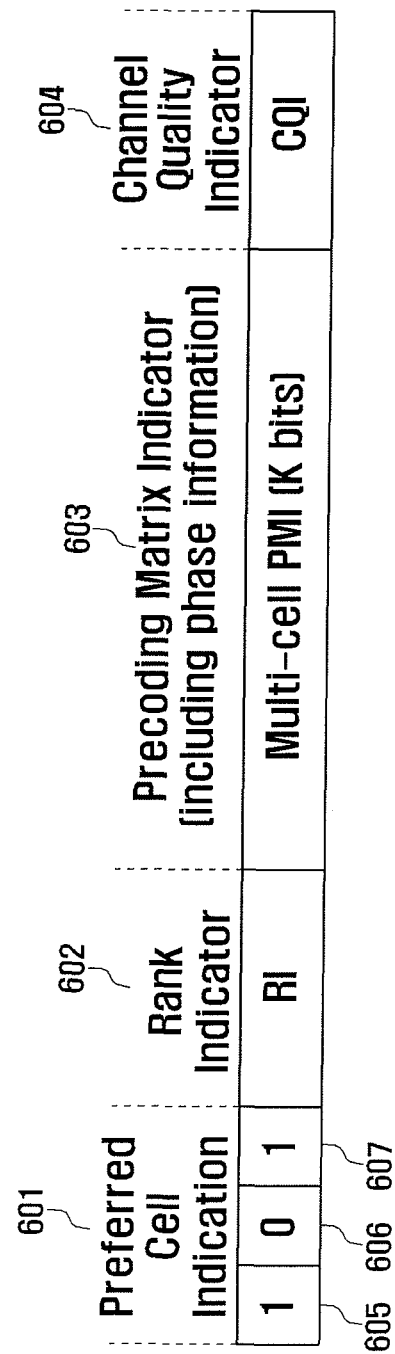
FIGS. 9 and 10 are diagrams illustrating feedback informations according to the third embodiment of the present invention.
Figure 10:
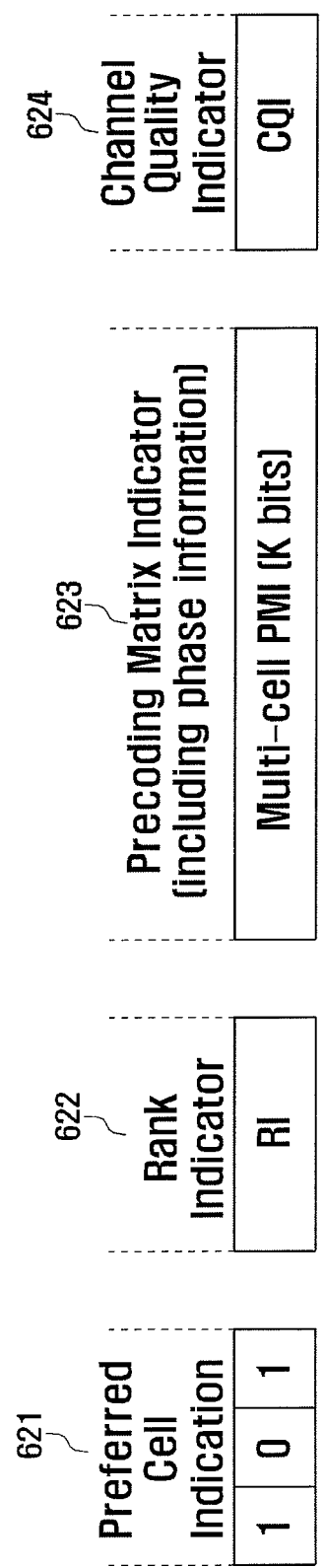

A description is made of the feedback informations according to the third embodiment of the present invention. FIGS. 9 and 10 are diagrams illustrating feedback informations according to the third embodiment of the present invention.

The feedback formats proposed in FIGS. 9 and 10 are defined for the case of using the codebook designed for multiple cells and can be designed in the form of combination of a single cell codebook and the quantized PIs for the collaborative base stations. Unlike the second embodiment, however, the multi-cell codebook proposed in the third embodiment is the size of the codebook is fixed regardless of the number of preferred collaborative cells. The multi-cell codebook is designed with a fixed size regardless of the number of the collaborative cells such that different codebooks are used depending on the number of the collaborative cells while maintaining the size of the feedback format.

As aforementioned in the first embodiment, it is assumed that the base station and terminal know the collaborative cells and the number of collaborative cells, and the number of collaborative cells is limited to 3 in the third embodiment too.

Referring to FIGS. 9 and 10, the feedback informations according to the third embodiment of the present invention includes Preferred Cell Indicator 601 and 621, Rank Indicator (RI) 602 and 622, Multi-cell Precoding Matrix Indicator (Multi-cell PMI) 603 and 623, and Channel Quality Indicator (CQI) 604 and 624.

The preferred cell indicator 601 and 621 indicates the preferred cell or non-preferred cell of the terminal among the collaborative cells in the form of a bitmap.

RI 602 and 622 indicates a number of Ranks to be used commonly by the collaborative cells and determined according to the channel state.

PMI 603 and 623 is basically to recommend the precoding vectors for the preferred cells indicated by the preferred cell indicator 601 and 621. Similar to the second embodiment, the precoding vectors includes the compensation values determined in consideration of the phases of the collaborative cells in the multi-cell environment. However, the multi-cell codebook according to the third embodiment has a fixed size regardless of the number of collaborative cells. Since the feedback informations are transmitted in the format fixed in size regardless of the number of collaborative cells, it is possible to reduce the processing complexity of the receiver.

The terminal indicates the preferred cells among the collaborative cells in the form of a bitmap. The terminal also selects the RI 602 and 622 and multi-cell PMI 603 and 623 for the each indicated cell. Here, it is assumed that the preferred collaborative cell is indicated by 1, and the non-preferred collaborative cell is indicated by 0; and the same RI is used for all of the collaborative cells. The PMI denotes the index in the multi-cell codebook designed for multiple cells, and the multi-cell codebook is designed to include the inter-cell phase information.

CQI 604 and 624 is the value determined in consideration of channel states of the collaborative cells in collaborative transmission, and the terminal determines CQI 604 and 624 that can be acquired based on the selected information (RI and PMI).

According to an embodiment of the present invention, the above-described feedback informations can be transmitted at a time or separately.

That is, the feedback informations can be defined into a feedback format to be mapped to PUCCH in a subframe and transmitted to the base station at a certain interval or the resource allocated in PUSCH in response to the feedback information request from the base station.

If there is no feedback format defined for carrying all of the feedback informations and thus if it is impossible to map the feedback informations to PUCCH of one subframe, the feedback informations can be transmitted separately in consideration of their properties as shown in FIG. 10. That is, the Preferred Cell Indicator 621, RI 622, PMI 623, and CQI 624 can be transmitted separately as mapped to PUCCH at PUCCH transmission interval of the terminal. In case that the feedback informations are transmitted separately on PUCCH at an interval of T subframes as shown in FIG. 10, the base station has to receive 4×T subframes to acquire all of the feedback informations.

Fourth Embodiment

Figure 11:
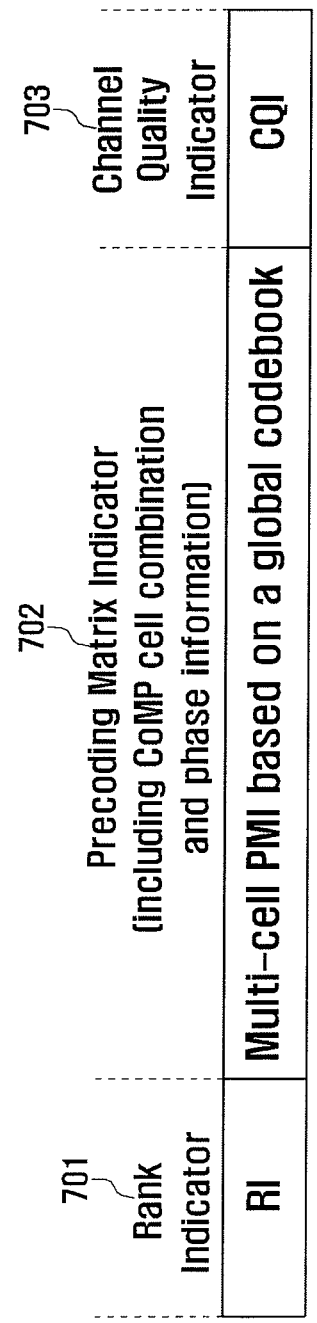
FIGS. 11 and 12 are diagrams illustrating feedback information according to the fourth embodiment of the present invention.
Figure 12:
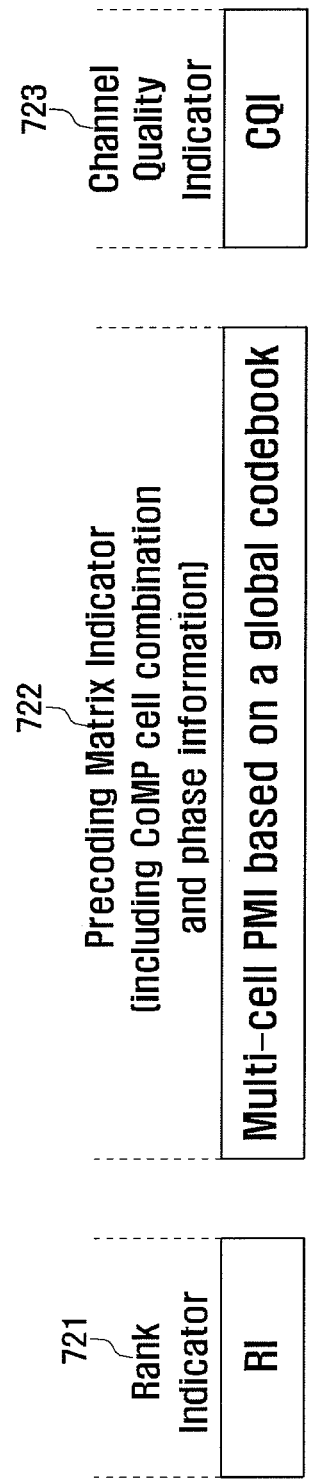

A description is made of the feedback informations according to the fourth embodiment of the present invention. FIGS. 11 and 12 are diagrams illustrating feedback information according to the fourth embodiment of the present invention.

The feedback formats proposed in FIGS. 11 and 12 are defined for the case of using the codebook designed for multiple cells.

The multi-cell codebook considered in the fourth embodiment of the present invention can be designed to include all available combinations of the collaborative cells and phase informations of the respective combinations, and the codebook according to the fourth embodiment is referred to as "global codebook."

The global codebook includes all of the preferred cells and precoding vectors of the preferred cells and phase compensation values of the preferred cells. That is, the PMI information selected from the global codebook includes the information on the preferred collaborative cells, PMIs of the respective cells, and RI information. Such a global codebook can be built by combining the codebooks described in the second and third embodiments for all available collaborative cells.

Referring to FIGS. 11 and 12, the feedback informations according to the fourth embodiment of the present invention includes Rank (RI) 701 and 721, Precoding Matrix Indicator (PMI) 702 and 722, and Channel Quality Indicator (CQI) 702 and 723.

RI 702 and 722 indicates a number of Ranks to be used commonly by the collaborative cells and determined according to the channel state.

PMI 703 and 723 is basically to recommend the precoding vectors for the preferred cells. However, the PMI 702 and 722 according to the fourth embodiment indicates the preferred cells, precoding vectors of the preferred cells, and phase compensation values of the respective collaborative cells.

CQI 703 and 723 is the value determined in consideration of channel states of the collaborative cells in collaborative transmission, and the terminal selects preferred RI 701 and 721 and PMI 702 and 722 and calculates CQI 703 and 723 based on the selected RI and PMI information.

According to an embodiment of the present invention, the above-described feedback informations can be transmitted at a time or separately.

As shown in FIG. 11, the feedback informations can be defined into a feedback format to be mapped to PUCCH in a subframe and transmitted to the base station at a certain interval or the resource allocated in PUSCH in response to the feedback information request from the base station.

If there is no feedback format defined for carrying all of the feedback informations and thus if it is impossible to map the feedback informations to PUCCH of one subframe, the feedback informations can be transmitted separately in consideration of their properties as shown in FIG. 12. That is, the RI 721, PMI 722, and CQI 723 can be transmitted independently as mapped to PUCCH at PUCCH transmission interval of the terminal. In case that the feedback informations are transmitted independently on PUCCH at an interval of T subframes as shown in FIG. 12, the base station has to receive 3×T subframes to acquire all of the feedback informations. In the fourth embodiment, since the global codebook is used, the feedback format is fixed in size.

The transmission/reception apparatus according to an embodiment of the present invention is described hereinafter.

Figure 13:
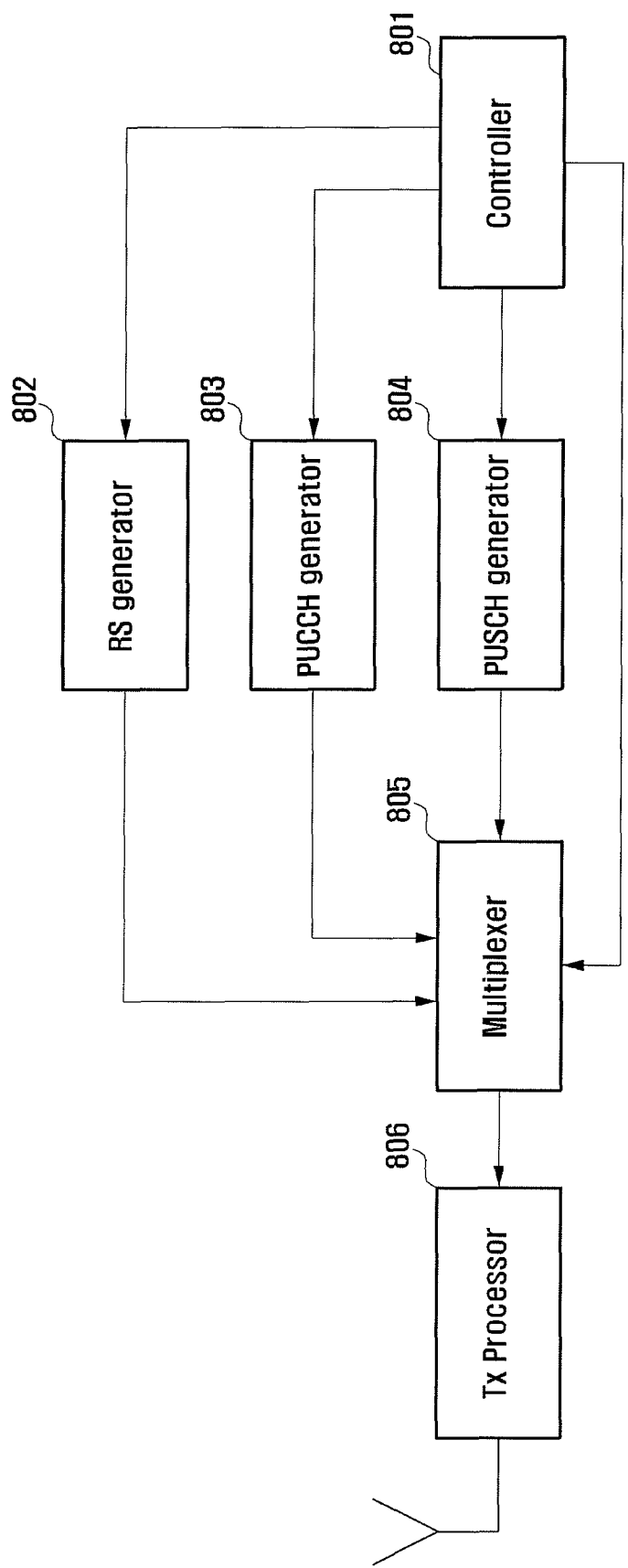
FIG. 13 is a block diagram illustrating a configuration of the transmission apparatus for transmitting the feedback information according to an embodiment of the present invention.

First of all, a description is made of a transmission apparatus for transmitting feedback informations according to an embodiment of the present invention. FIG. 13 is a block diagram illustrating a configuration of the transmission apparatus for transmitting the feedback information according to an embodiment of the present invention.

Referring to FIG. 13, the transmitter according to an embodiment of the present invention includes a controller 801, an RS generator 802, a PUCCH generator 803, a PUSCH generator 804, a multiplexer 805, and a TX processor 806. The transmitter can be implemented as a part of a terminal.

The RS generator 802, the PUCCH generator 803, and the PUSCH generator 804 generate RS symbols, control channel symbols, and data channel symbols respectively under the control of the controller 801.

The controller 801 generates feedback information which can be formatted as described in one of the first to fourth embodiments.

The controller 801 controls the RS generator 802, the PUCCH generator 803, and the PUSCH generator 804 to generate RS symbols, control channel symbols, and data channel symbols, respectively. The generated RS symbols, control channel symbols, and data channel symbols are multiplexed with RS symbols generated by the RS generator 802 by means of the multiplexer 805.

At this time, the controller 801 does not allow simultaneous mapping to PUCCH and PUSCH to maintain the single carrier characteristic. In case that the base station has allocated PUSCH resource for feedback information report, the symbols of the feedback information generated by the PUCCH generator 803 are mapped in PUSCH region and multiplexed with the RS symbols so as to be transmitted by means of the TX processor 806. This process is performed under the control of the controller 801. If it is required to transmit the feedback information separately on PUCCH, the controller 801 controls the PUCCH generator 803 to supply the separated feedback information symbols at an interval acquired from the base station.

That is, the controller 801 generates feedback information and controls to generate symbols corresponding channel according to the resource allocated by the base station and map the symbols to the transmission resource of the corresponding channel.

For example, in case that the resource for transmitting the feedback information is allocated in PUCCH, the controller 801 controls the PUCCH generator 803 to generate control channel symbols carrying the feedback information and controls the multiplexer 805 to map the control channel symbols to the resource allocated in PUCCH.

In case that the resource for transmitting the feedback information is allocated in PUSCH, the controller 801 controls the PUSCH generator 804 to generated data symbols carrying the feedback information and controls the multiplexer 805 to map the data channel symbols to the resource allocated in PUSCH.

Figure 14:
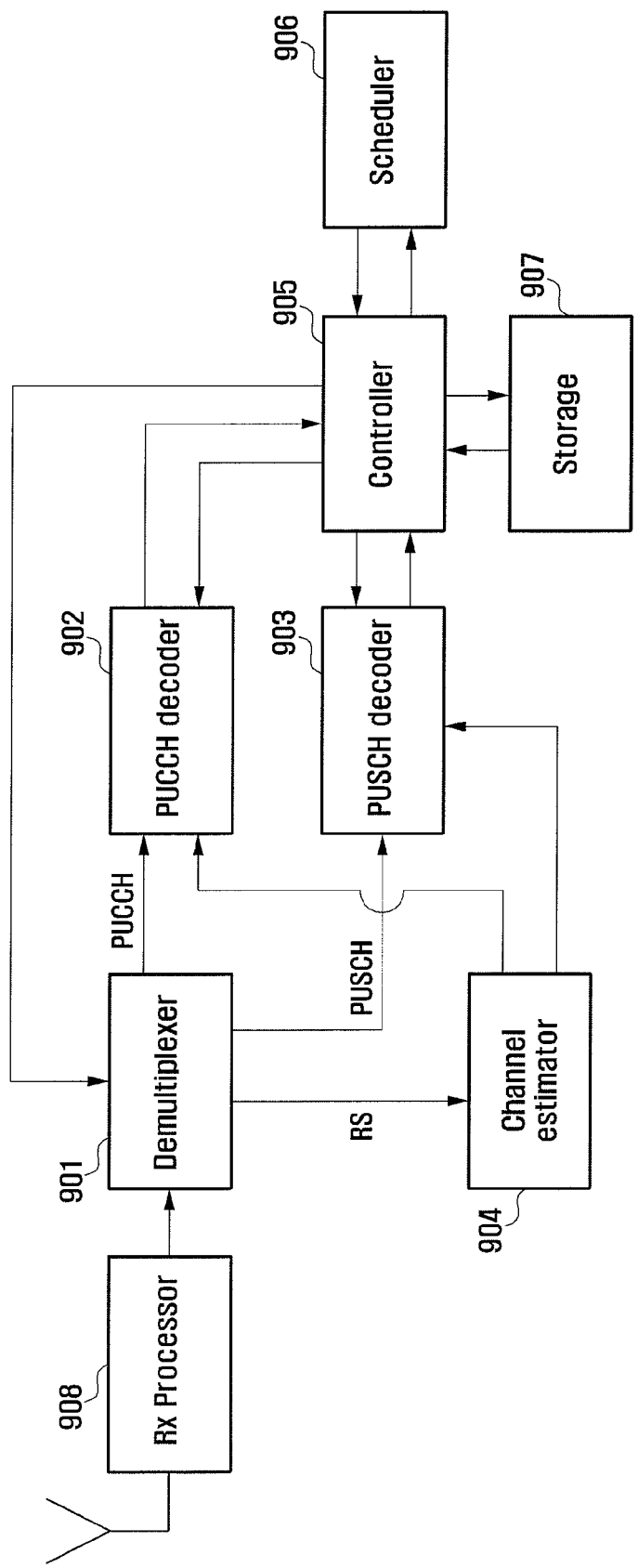
FIG. 14 is a block diagram illustrating the reception apparatus for receiving the feedback information according to an embodiment of the present invention.

A description is made of the reception apparatus for receiving the feedback information according to an embodiment of the present invention. FIG. 14 is a block diagram illustrating the reception apparatus for receiving the feedback information according to an embodiment of the present invention.

Referring to FIG. 14, the reception apparatus for receiving the feedback information according to an embodiment of the present invention includes a demultiplexer 901, a PUCCH decoder 902, a PUSCH decoder 903, a channel estimator 904, a controller 905, a scheduler 906, a storage 907, and a reception processor 908. The reception can be a part of the base station.

The received signal is converted into a baseband signal by the reception processor 908.

The demultiplexer 901 demultiplexes the baseband signal into RS, PUCCH, and PUSCH. Here, the PUCCH and PUSCH signals are input to the PUCCH decoder 902 and the PUSCH decoder 903 respectively, and the RS signal is input to the channel estimator 904.

The channel estimator 904 estimates channel using RS. The channel estimation value output by the channel estimator 904 is input to the PUCCH decoder 902 and the PUSCH decoder 903 for decoding PUCCH and PUSCH signals.

If the scheduler 906 notifies the controller 905 of the PUCCH region allocated for the feedback information report of a certain terminal, the controller 905 controls to transfer the feedback information signal mapped in the PUCCH region from the demultiplexer 901 to the PUCCH decoder 902 so as to decode the feedback information.

If the scheduler 906 notifies the controller 905 of the PUSCH region allocated for the feedback information report of a certain terminal, the controller 905 controls to transfer the feedback information signal mapped in the PUSCH region from the demultiplexer 901 to the PUSCH decoder 903 so as to decode the feedback information.

The feedback information decoded from the feedback information signal is input to the controller 905, and the controller forwards the feedback information to the scheduler 906.

The controller 905 can recognize that the feedback informations of a certain terminal are received separated at a given interval based on the information provided by the PUCCH decoder 902.

The controller 905 controls to the feedback informations received separately in the storage 907 until the entire feedback information of a certain terminal are received completely. Once the feedback informations of a certain terminal are received completely, the controller 905 transfers the complete feedback information stored in the storage to the scheduler 906.

That is, the scheduler 906 notifies the controller 905 of which channel is used to carry the feedback information such that the controller 905 receives the feedback information through the corresponding decoder. If the feedback informations are received on PUCCH in a plurality of subframes, the controller 905 accumulates the feedback informations in the storage 907 until all of the feedback informations are received completely.

The feedback information transmission/reception method according to an embodiment of the present invention is described hereinafter.

First of all, a description is made of the feedback information transmission method according to an embodiment of the present invention. FIG. 15 is a flowchart illustrating the feedback information transmission method according to an embodiment of the present invention.

Although not depicted in FIG. 15, the terminal receives the informations on the collaborative cells such as collaborative cell identifier (ID) from the base station in prior such that both the base station and terminal know the collaborative cells and the number of collaborative cells.

Referring to FIG. 15, the terminal is allocated the resource for transmitting the feedback information (1001). The terminal can be allocated the transmission resource through PDCCH, and the resource for transmitting the feedback information can be allocated in one of PUCCH and PUSCH. Particularly in case that the resource is allocated in PUCCH, the feedback informations can be transmitted at a time in one subframe or separately in a plurality of subframes.

Next, the terminal generates feedback information (1003). The feedback informations can be formatted as proposed in one of the first to fourth embodiments.

Once the feedback information is generated, the terminal determines the resource for transmitting the feedback information (1005). The feedback information transmission is performed on the transmission resource allocated by the base station.

In case that the feedback information transmission resource is allocated in PUSCH, the terminal transmits the feedback information through PUSCH (1007).

In case that the feedback information transmission resource is allocated in PUCCH, the terminal determines whether to transmit the feedback informations at a time in one subframe (1009). That is, the base station determines whether it is possible to transmit all of the feedback informations allocated the PUCCH resource in a subframe.

If it is possible to transmit the feedback information in a subframe, the terminal transmits all of the feedback informations on PUCCH in one subframe as described with reference to FIGS. 2, 7, 9, and 11 (1011).

If it is impossible to transmit the feedback information in a subframe, the terminal transmits the feedback informations separately on PUCCH across a plurality of subframes as described with reference to FIGS. 3, 8, 10, and 12 (1013).

According to an embodiment of the present invention, the feedback information can be transmitted on one of PUCCH and PUSCH. Particularly in case of using PUCCH, the feedback information can be transmitted in one subframe or across a plurality subframes according to the allocated transmission resource.

A description is made of the method for receiving the feedback information transmitted as above. FIG. 16 is a flowchart illustrating the feedback information reception method according to an embodiment of the present invention.

Referring to FIG. 16, if a signal transmitted by a terminal is received, the base station demultiplexes the received subframe into PUCCH, PUSCH, and RS (1101).

Next, the base station determines which channel is used to transmit the feedback information (1003). That is, the base station determines whether the feedback information is transmitted on PUSCH or PUCCH. The determination is made based on the information on the transmission resource allocated to the terminal.

If the feedback information is transmitted on PUSCH, the base station receives the feedback information on the resource allocated in PUSCH (1105).

Otherwise if the feedback information is transmitted on PUCCH, the base station determines whether all of the feedback informations are received in a subframe (1007). That is, the base station determines whether the resource allocated on PUCCH in a subframe for the feedback information has a size enough to carry all of the feedback informations.

If the size of the resource allocated on PUCCH in a subframe has the size enough to accommodate all of the feedback informations, the base station receives all of the feedback informations on PUCCH in one subframe as described with reference to FIGS. 2, 7, 9, and 11 (1109).

Otherwise if the size of the resource allocated on PUCCH in a subframe has a size not enough to accommodate all of the feedback informations, the base station receives the feedback informations on PUCCH across a plurality of subframes as described with reference to FIGS. 3, 8, 10, and 12 (1111).

As described above, upon receipt of the feedback information through one of PUCCH and PUSCH, the base station performs scheduling based on the feedback information (1113). For this purpose, the base station share the feedback information with collaborative cells (base stations). The collaborative cells sharing the feedback informations perform scheduling based on the feedback information and can execute COMP.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A method for transmitting feedback information for collaborative transmission in a cellular radio communication system, the method comprising:

receiving, from a base station, collaborative cell information indicating at least three collaborative cells;

determining at least two preferred collaborative cells among the at least three collaborative cells;

generating feedback information including cell indicators for discriminating between the at least two preferred collaborative cells and at least one non-preferred collaborative cell, precoding matrix indicators for the at least two preferred collaborative cells, and channel quality indicators; and transmitting the feedback information via one of a control channel and a data channel, wherein the feedback information is transmitted in a transmission format having a fixed size regardless of a number of collaborative cells.

2. The method of claim 1, wherein the precoding matrix indicators indicate precoding vectors corresponding to the at least two preferred collaborative cells.

3. The method of claim 1, wherein the precoding matrix indicators indicate a precoding vector, minimizing inter-cell interference in the collaborative transmission, that is recommended to be used for the at least two preferred collaborative cells.

4. The method of claim 1, wherein the precoding matrix indicators indicate a precoding vector mapped to the at least two preferred collaborative cells in a multi-cell codebook that is a single codebook generated for the at least three collaborative cells.

5. The method of claim 4, wherein the multi-cell codebook includes compensation values determined based on phases of the at least three collaborative cells.

6. A method for receiving feedback information for collaborative transmission in a cellular radio communication system, the method comprising:

receiving feedback information including cell indicators for discriminating between at least two preferred collaborative cells and at least one non-preferred collaborative cell, precoding matrix indicators for the at least two preferred collaborative cells, and channel quality indicators, via one of a control channel and a data channel; and scheduling the collaborative transmission based on the feedback information, wherein the feedback information is transmitted in a transmission format having a fixed size regardless of a number of collaborative cells.

7. The method of claim 6, wherein the precoding matrix indicators indicate precoding vectors corresponding to the at least two preferred collaborative cells.

8. The method of claim 6, wherein the precoding matrix indicators indicate a precoding vector, minimizing inter-cell interference in the collaborative transmission, that is recommended to be used for the at least two preferred collaborative cells.

9. The method of claim 6, wherein the precoding matrix indicators indicate a precoding vector mapped to the at least two preferred collaborative cells in a multi-cell codebook that is a single codebook generated for at least three collaborative cells.

10. The method of claim 9, wherein the multi-cell codebook includes compensation values determined based on phases of the at least three collaborative cells.

11. An apparatus for transmitting feedback information for collaborative transmission in a cellular radio communication system, the apparatus comprising:

a receiver configured to receive a first Radio Frequency (RF) signal;

a transmitter configured to transmit a second RF signal; and a controller configured to:

control the receiver to receive, from a base station, the first RF signal including collaborative cell information indicating at least three collaborative cells, determine at least two preferred collaborative cells among the at least three collaborative cells, generate feedback information including cell indicators for discriminating between the at least two preferred collaborative cells and at least one non-preferred collaborative cell, precoding matrix indicators for the at least two preferred collaborative cells, and channel quality indicators, and control the transceiver to transmit the second RF signal including the feedback information via one of a control channel and a data channel, wherein the feedback information is transmitted in a transmission format having a fixed size regardless of a number of collaborative cells.

12. The apparatus of claim 11, wherein the precoding matrix indicators indicate precoding vectors corresponding to the at least two preferred collaborative cells.

13. The apparatus of claim 11, wherein the precoding matrix indicators indicate a precoding vector, minimizing inter-cell interference in the collaborative transmission, that is recommended to be used for the at least two preferred collaborative cells.

14. The apparatus of claim 11, wherein the precoding matrix indicators indicate a precoding vector mapped to the at least two preferred collaborative cells in a multi-cell codebook that is a single codebook generated for the at least three collaborative cells.

15. The apparatus of claim 14, wherein the multi-cell codebook includes compensation values determined based on phases of the at least three collaborative cells.

16. An apparatus for receiving feedback information for collaborative transmission in a cellular radio communication system, the apparatus comprising:

a receiver configured to receive a Radio Frequency (RF) signal; and a controller configured to:

control the receiver to receive the RF signal including feedback information including cell indicators for discriminating between at least two preferred collaborative cells and at least one non-preferred collaborative cell, precoding matrix indicators for the at least two preferred collaborative cells, and channel quality indicators, via one of a control channel and a data channel, and schedule the collaborative transmission based on the feedback information, wherein the feedback information is transmitted in a transmission format having a fixed size regardless of a number of collaborative cells.

17. The apparatus of claim 16, wherein the precoding matrix indicators indicate precoding vectors corresponding to the at least two preferred collaborative cells.

18. The apparatus of claim 17, wherein the precoding matrix indicators indicate a precoding vector, minimizing inter-cell interference in the collaborative transmission, that is recommended to be used for the at least two preferred collaborative cells.

19. The apparatus of claim 17, wherein the precoding matrix indicators indicate a precoding vector mapped to the at least two preferred collaborative cells in a multi-cell codebook that is a single codebook generated for at least three collaborative cells.

20. The apparatus of claim 19, wherein the multi-cell codebook includes compensation values determined based on phases of the at least three collaborative cells.

* * * * *